Apr. 10, 1923.   1,451,349
G. S. TOWNE
POWER TRANSMISSION BELT
Filed Apr. 26, 1922
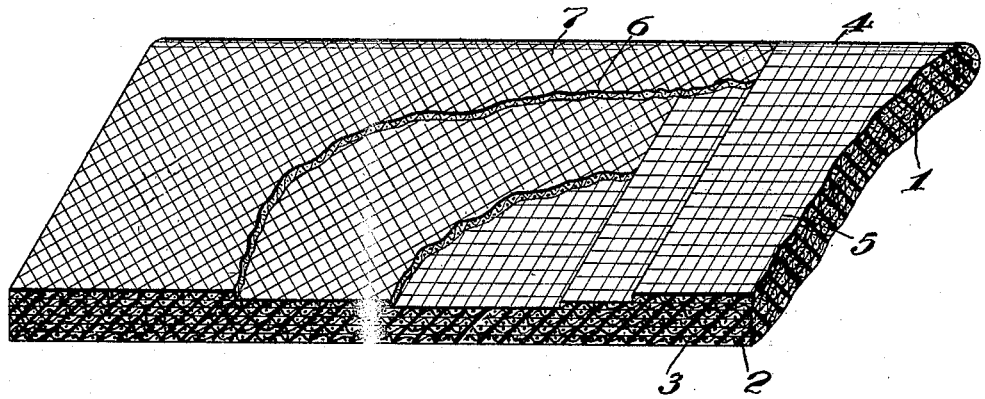
Fig. I
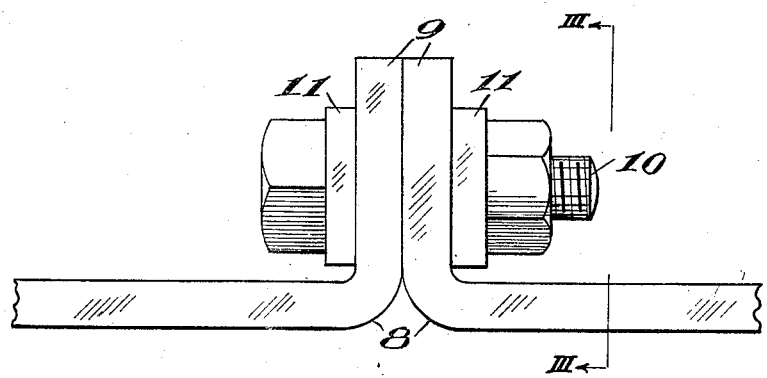
Fig. II
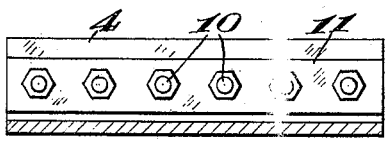
Fig. III
INVENTOR
GEORGE S. TOWNE
by Acker & Totten
Attorneys.

Patented Apr. 10, 1923.

1,451,349

UNITED STATES PATENT OFFICE.

GEORGE S. TOWNE, OF SAN FRANCISCO, CALIFORNIA.

POWER-TRANSMISSION BELT.

Application filed April 26, 1922. Serial No. 556,744.

*To all whom it may concern:*

Be it known that I, GEORGE S. TOWNE, a citizen of the United States, residing at the city and county of San Francisco and State of California, have invented certain new and useful Improvements in Power-Transmission Belts, of which the following is a specification.

In drilling oil, gas and like wells, power is transmitted for the actuation of the drilling tools by a flexible transmission belt tightly stretched over sheaves, one of which is the conventional "bull wheel." The belt is subjected in its transmission of power to sudden strains, which, due to the manner of attaching the belt ends, causes a gradual tearing of the belt laminations at the point of its attachment, necessitating the taking-up of the belt, when possible, and the attaching of the ends together at a new place; but in the majority of cases, the belt, due to the constant breaking of the ends at their point of uniting, soon becomes too short for use and is required to be replaced at a considerable expense.

These transmission belts at present employed are of a relatively heavy type and consist of a number of fabric laminations vulcanized together and disposed with the fabric forming threads transversely and longitudinally of the belt, affording maximum strength and comparatively non-stretchable.

In attaching the belt ends, the conventional lacing and end attaching means having proved inefficient, the ends of the belt are bent outwardly at right angles to form flanges which are secured together by bolts passing therethrough and clamp plates which are tightly drawn together by the bolts uniting the flanges and which subject the laminations at the inner face of the belt, at the point of its outward bend, to severe strains and a cutting action.

By my present invention, I materially increase the life of the belt, and in accomplishing this object, use the conventional form of belt now employed, and on one surface thereof, for a considerable distance inwardly from the ends, face the same with one or more laminations of fabric, the forming threads of which are preferably disposed obliquely across the surface of the belt, affording a stretch for the belt surface at its point of outward bending to provide flanges utilized in clamping the belt ends together, the stretch afforded by the laminations reducing to a minimum the rupturing of the threads of the remaining laminations at the point of bending.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 1 is a longitudinal sectional broken perspective view of a belt constructed in accordance with my invention.

Fig. 2 is a view in side elevation of a power transmission belt illustrating the manner of securing the ends.

Fig. 3 is a vertical sectional view taken on line 3—3 of Fig. 2.

Referring more particularly to the several views of the drawings, wherein like characters of reference designate corresponding parts—1 indicates the superimposed fabric forming laminations impregnated with rubber 2 and vulcanized into a flexible integral mass, the same forming a conventional power transmission belt now employed. The warp threads 3 of the laminations 1 extend parallel with the sides of the belt 4 and the woof threads 5 extend transversely of the belt, this construction eliminating longitudinal stretch in the belt and affording maximum strength to enable the belt to be tightly stretched when in use. The surface laminations 1 of the belt, adjacent one or both ends (one end being illustrated) fall short of extending to the end of the belt, and in continuing the belt surface the stretchable laminations 6 are employed, they being preferably vulcanized to the laminations 1 to provide an even surface for the belt and to form with the belt laminations 1 a flexible integral structure, the laminations 6 being disposed with their forming threads 7 obliquely across the face of the belt. The laminations 6 in Fig. 1 are illustrated as two in number, but it is to be understood that the same may be increased or decreased as required in belts manufactured for various purposes. The laminations 6 being cut on the bias, afford a stretch or elastic surface for the inner face of the belt, which when bent outwardly at points 8 (Fig. 2) to provide the end attaching flanges 9, permit of a yield or give to the inner face of the belt and reduce to a minimum the liability of the belt rupturing at this point.

The use of this type of belt has demonstrated that the laminations forming the inner face of the belt at the point of uniting its ends fractures first and that the continual passing of this clamped portion over the sheaves causes a gradual fracturing of the remaining laminations outwardly from the inner face, and that the providing of a stretchable surface at the point of end uniting or clamping of the belt ends materially retards the wearing of the belt at this point of uniting, thus prolonging the life thereof.

In the particular work for which this belt is designed, the portions or flanges 9 are united by bolts 10 passed therethrough and which clamp the portions 9 together by clamp plates 11 through which the bolts also pass.

I claim:—

1. A power transmission belt including a substantially inelastic woven body, the opposite ends thereof being formed with a woven elastic surface, and means for securing said belt ends together with said elastic surfaces in substantially parallel meeting relation at substantially right angles to the normal plane of the body of the belt.

2. A power transmission belt including a substantially inelastic woven body, mounting at opposite ends on corresponding faces, a woven elastic surface vulcanized thereto, said surface at each end extending a short distance inwardly from the belt ends, and means for securing said belt ends together with the elastic surfaces in meeting relation.

In testimony whereof I have signed my name to this specification.

GEORGE S. TOWNE.